Oct. 31, 1950     C. A. THOMAS     2,528,255
PARLOR STALL
Filed Feb. 18, 1944     3 Sheets-Sheet 1
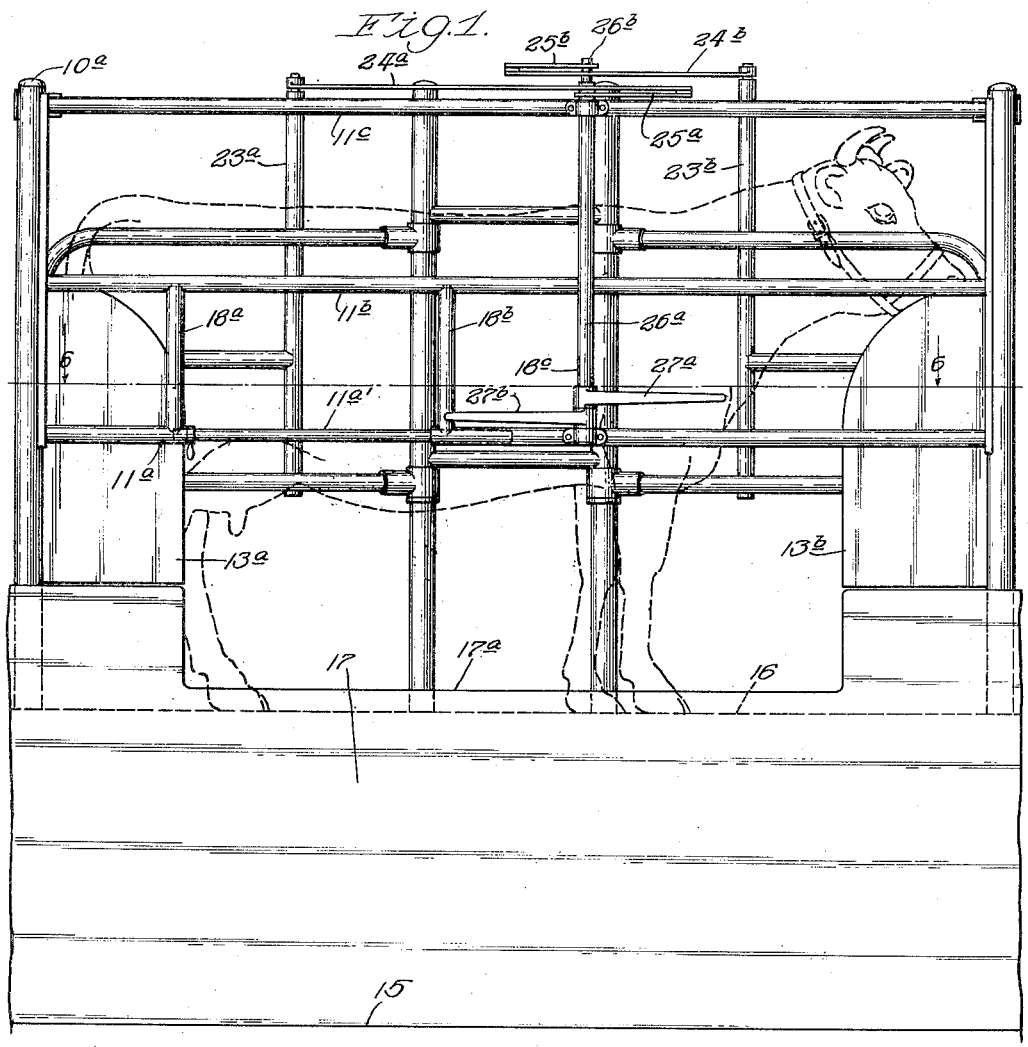
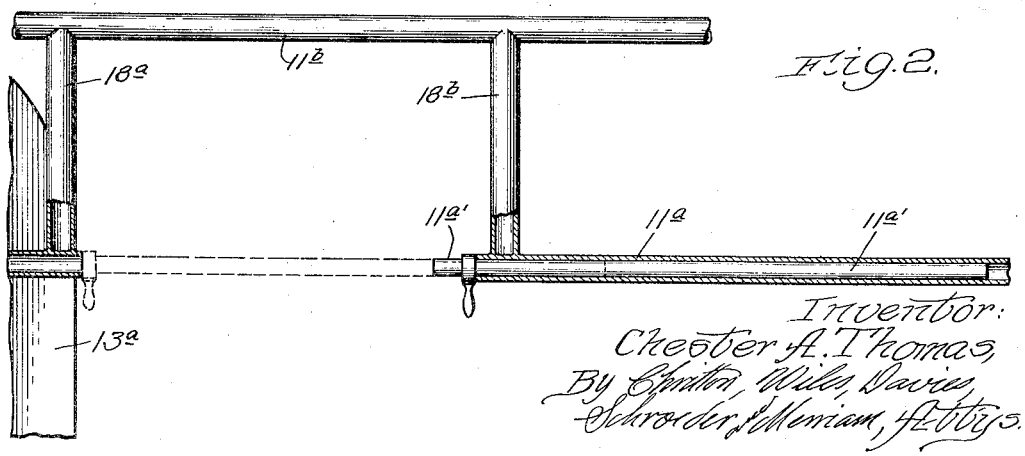
Inventor:
Chester A. Thomas Oct. 31, 1950  C. A. THOMAS  2,528,255
PARLOR STALL
Filed Feb. 18, 1944  3 Sheets-Sheet 2
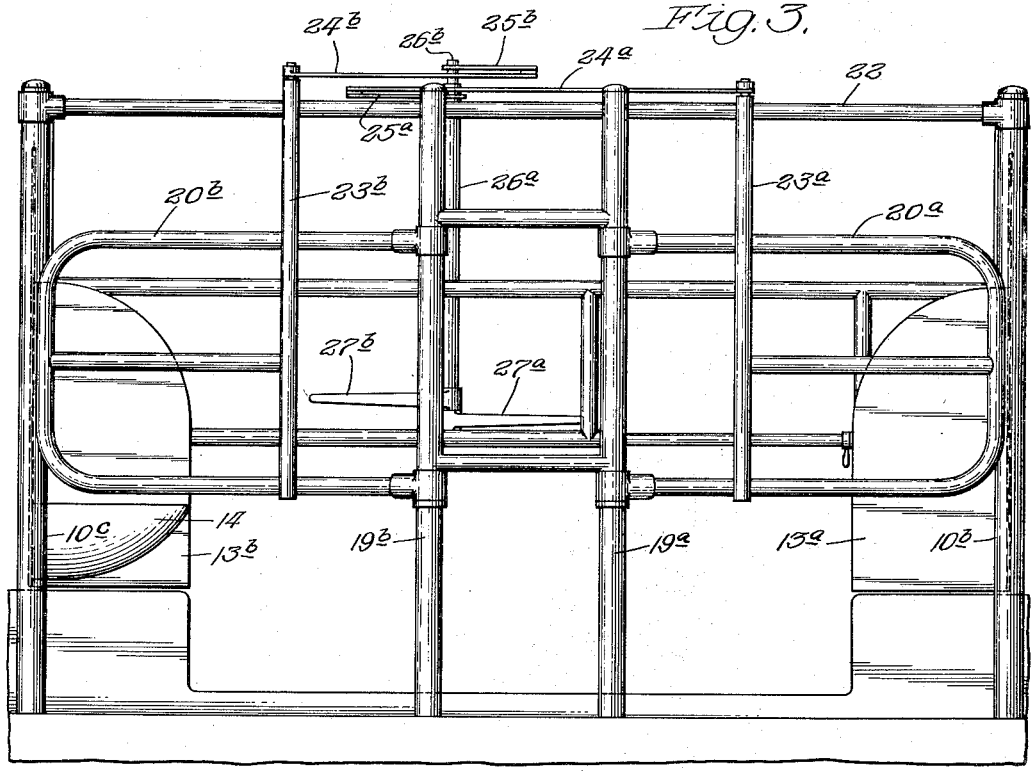
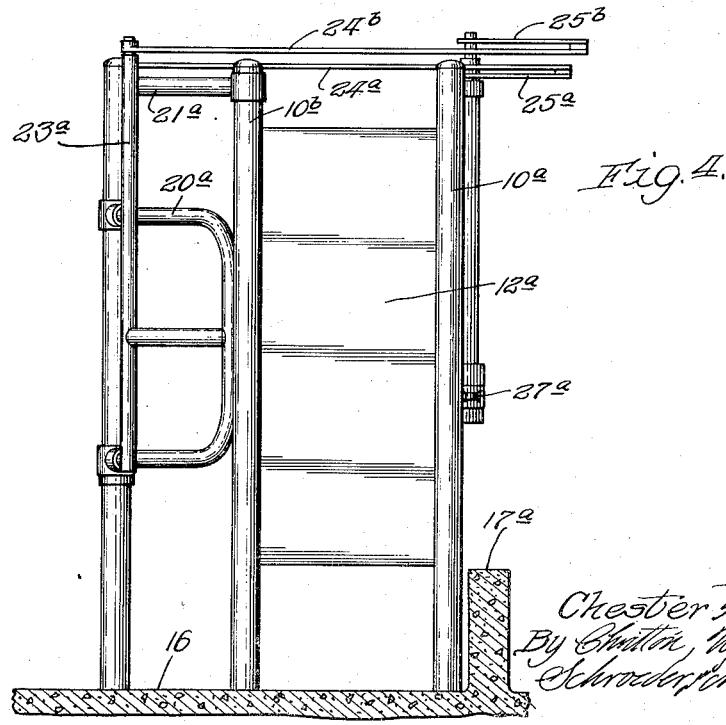
Inventor:
Chester A. Thomas,
By Chritton, Wiles, Davies,
Schroeder, & Merriam, Attys.

Oct. 31, 1950 C. A. THOMAS 2,528,255
PARLOR STALL
Filed Feb. 18, 1944 3 Sheets-Sheet 3

Inventor:
Chester A. Thomas,

Patented Oct. 31, 1950

2,528,255

UNITED STATES PATENT OFFICE 2,528,255

PARLOR STALL

Chester A. Thomas, Crystal Lake, Ill., assignor to Babson Bros. Co., a corporation of Illinois Application February 18, 1944, Serial No. 522,883

2 Claims. (Cl. 119—27)

1

This invention relates to a parlor stall, and more particularly to an improved construction and arrangement for milking parlors and the stalls used therein.

Figure 5:
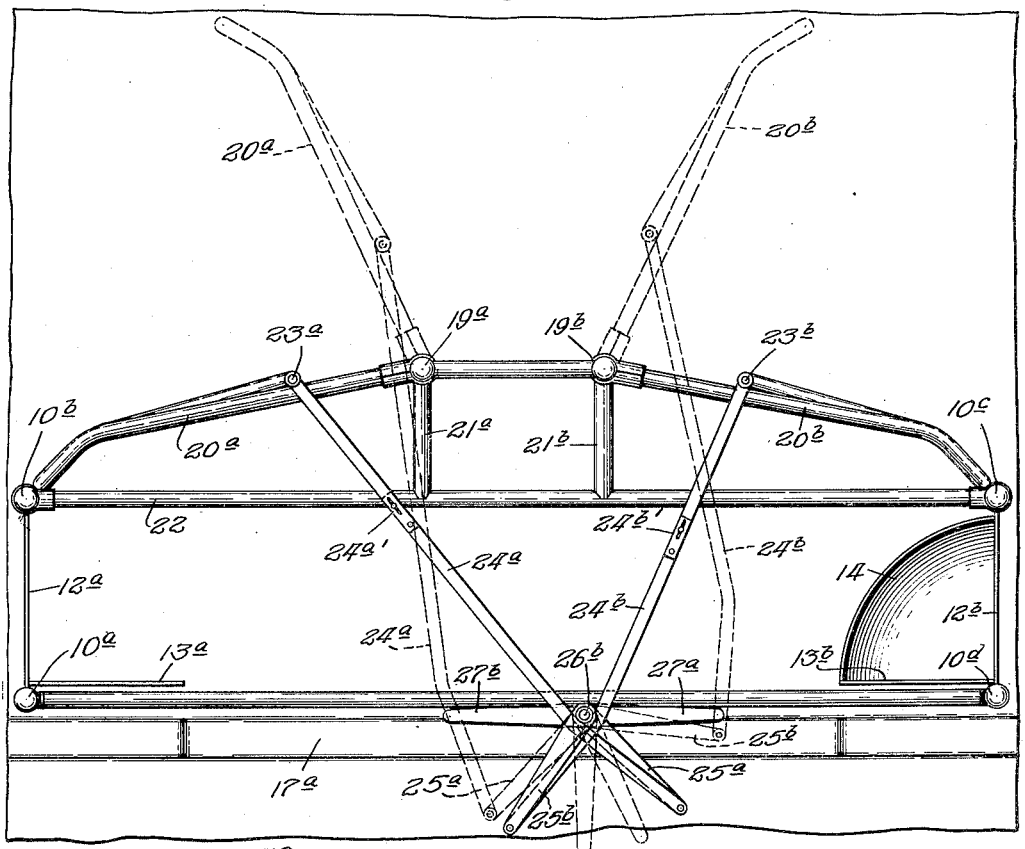
Figure 6:
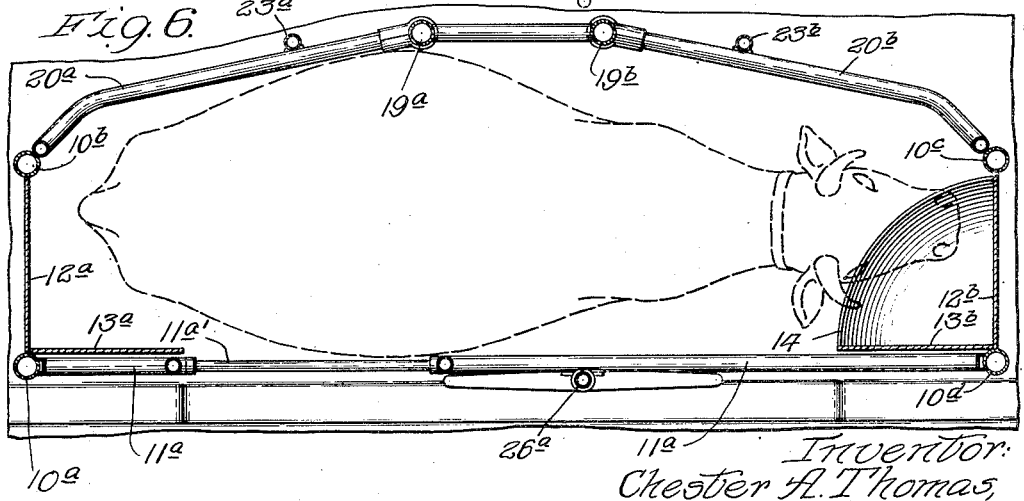

One feature of this invention is that it provides an improved stall for housing a cow or other animal being milked; another feature of this invention is that it is provided with a movable part in one side of the stall adjacent the udder of the animal to facilitate operation on such udder without danger to the operator; and still another feature of this invention is the provision of a stall which is substantially narrower at its ends than in its middle, with both the entrance and exit gates being in one side of such a stall, and at least the end portions of these gates being inwardly curved. Other features and advantages of this invention will be apparent from the following specification and the drawings, in which:

Figure 1 is an elevational view, from the opertor's side, of an arrangement embodying this invention, with the outline of a cow indicated in the stall; Figure 2 is a fragmentary enlarged view of a portion of the stall shown in Figure 1, with a movable part in open position; Figure 3 is an elevational view of such stall from the cow alley side; Figure 4 is an end elevational view, partly in section, looking from the left of Figure 1; Figure 5 is a top plan view, with the gates being shown in closed position in solid lines and in open position in dotted lines; and Figure 6 is a horizontal sectional view along the line 6—6 of Figure 1, with the outline of a cow indicated therein.

Modern dairies with herds of any appreciable size are tending to employ milking parlors for the milking. Such a parlor comprises a group of stalls which are intended to house the animal only during the milking period, generally termed "parlor" stalls to distinguish them from the conventional stalls in the dairy barn. Such a parlor is usually a separate room at one end of the dairy barn, or a separate building adjacent the regular barn or barns, as the case may be. Instead of milking the cows successively while they remain in their regular stalls, they are freed from such stalls and driven into the milking parlor. The arrangement is generally such that there is a cow alley on one side of the row of parlor stalls and an operator's alley on the other side. The cows enter at one end of their alley, go into the parlor stalls, are milked, and leave the other end of the alley to return to their regular stalls in the dairy barn. Such an arrangement facilitates

2 the highest degree of sanitation, prevents disturbance of the other cows not being milked until later, and enables one operator to milk a larger number of cows with less exertion.

Referring now more particularly to the embodiment of my invention illustrated in the drawings, the stall is shown as comprising four main corner posts 10a—d connected by longitudinal and transverse pipe members, the longitudinal pipe members on the side of the stall facing the operator being here identified as 11a—c. The space between the posts 10a and 10b on the one hand, and 10c and 10d on the other hand, are closed by sheet metal partition elements here identified as 12a and 12b. Sheet metal splash panels 13a and 13b are provided at the front and back on the operator's side of the stall; and a trough 14 at the forward end of the stall is adapted to hold feed intended to occupy the cow's attention during milking.

As may be best seen in Figure 1, the floor of the operator's alley, here identified as 15, is substantially below the floor 16 which supports the cow, these different height floors being adjacent each other on the operator's side and held in proper relation by a vertical wall here identified as 17. In practice such wall would be of concrete, and would extend up slightly above the level of the stall floor 16 to form a curb here identified as 17a, with slightly higher end portions meeting the splash guards 13.

I prefer, for reasons which will be apparent shortly hereafter, to have the operator's floor 15 between 2½ and 3 feet below the level of the stall floor 16, this latter normally being at the same level as the floor of the cow alley. Also, I prefer to have the lowermost longitudinal member, here identified as 11a, at about the same height as the under side of the cow, as for example about 2 feet 4 inches above the stall floor 16; and to have the longitudinal member 11b higher than the normal height of an operator standing on the floor 15, as for example 1 foot 3 inches above the member 11a. The top longitudinal member 11c may be any convenient height slightly above the normal height of a cow, as for example 1 foot 6 inches above the member 11b. No vertical members extend to the floor from the longitudinal member 11a, this being supported by its connection to the end posts 10a and 10d, and being braced by upwardly extending pipe members here identified as 18a and 18b.

While a suspended milker does a very clean and complete milking job, some cows have to be stripped briefly by hand after the mechanical milking, and this has heretofore involved considerable danger in milking parlors of conventional design. It is necessary to have the lowermost longitudinal member, as the member 11a here, at about the height of the under side of the cow, rather than up near the top of her head, to prevent the cow accidentally falling out of the stall into the operator's alley, kneeling and rolling out from under this longitudinal member, and the like. Moreover, the cows sometimes shift over to the far side of the stall and render it difficult for an operator easily to reach the udder to strip it by hand. This has resulted in the operator frequently ducking down and sticking his head and shoulders under and up beyond the lowermost longitudinal member (with his head lying between such member and the cow's body) to perform the stripping. Then if the cow surges back, or kicks, the operator may have his face and head badly smashed. I have provided an arrangement which ensures proper housing of the cow, and yet completely obviates this danger, by providing a movable part 11a' adapted to be moved back to provide an opening adjacent the udder of the cow facilitating stripping or other operations on such udder. This may be best seen in Figures 1 and 2, the movable part 11a' being shown in closed position in Figure 1 and in open position in Figure 2. Such movable part is here shown as a rod adapted to telescope within the right-hand part of the pipe member 11a as shown in Figure 2. When the part is in such open position, an opening is provided bounded on the top by the pipe member 11b and on the sides by the vertical pipe members 18a and 18b. Since the longitudinal pipe member 11b is above the height of the normal operator when he is standing on the floor 15 (preferably from 6 to 6½ feet above such floor), and the vertical pipes 18a and 18b are substantially spaced (preferably 2 feet or more), an opening is provided adjacent the udder which permits a man to put his head and shoulders freely and safely within the stall, since there is nothing to prevent his moving backward and away quickly if such should be necessary. This improvement is the subject of my continuation-in-part application Serial No. 122,999, filed Oct. 22, 1949.

Referring now more particularly to Figures 5 and 6, it will be seen that the end portions of the stall (the spacing between the posts 10a and 10b on the one hand and 10c and 10d on the other hand) are considerably narrower than the normal width of the cow, as indicated by the outline of a cow in Figure 6. The side of the stall facing the cow alley is made somewhat bowed, as may be best seen in these two figures. This side portion has two vertical posts 19a and 19b serving as hinge posts for the gates 20a and 20b, these extending somewhat inwardly (when in closed position) and being more sharply inwardly turned or curved near their end portions adapted to abut the posts 10b and 10c. I have found it desirable to have the gates occupy the principal portion of the length of the stall on the one side; for example, the posts 19a and 19b may be only 1 foot 6 inches apart out of a total stall length of 8 feet. Moreover, making the ends of the stall only about ⅔ the central width of the stall (as for example 1 foot 8 inches out of a total width of 2 feet 9 inches), and having the gates inwardly curved, has at least two advantages. In the first place, it enables the stall to be a snugger fit with respect to the normal width of a cow than has heretofore been possible, while maintaining proper freedom of entrance and exit of the cow. This is advantageous, of course, in that it minimizes side movement by the cow during milking or stripping. In the second place, it enables parlor stalls to be placed end to end in a straight row, rather than in staggered or zigzag relationship as has heretofore been customary. In order to keep the width of the stall within reasonable limits it has heretofore been deemed desirable to have the cow enter from the back of the stall, between the corner posts 10a and 10b, which had to be appropriately spaced. By making the spacing between these end posts much narrower than the central width of the stall, however, it has been found that a cow will easily enter the stall when the gate 20a is in open position as shown in dotted lines in Figure 5. Moreover, the precise placement of the post 19a is important, since it bears against the left side of the cow as she enters and causes her to swing her body around and line it up properly in the stall as she reaches for the feed in the bin 14; and the provision of a curved gate 20a enables the proper placement of the post 19a and the use of narrower spacing between the end plates while at the same time permitting the gate 20a to close (as shown in Figure 6) without rubbing against or squeezing the cow.

The upper ends of the posts 19a and 19b are preferably connected by overhead bracing members 21a and 21b to an upper longitudinal pipe member 22 extending from the post 10b to the post 10c. Upwardly extending pipe or rod members 23a and 23b are mounted on and swingable with the gates 20a and 20b. The upper ends of these members are connected to links 24a and 24b connected to operating levers 25a and 25b mounted at the tops of coaxial members 26a and 26b, the former being a pipe member and the latter a rod member. These may be rotated by handle members 27a and 27b on the operator's side; and, as may be best seen in Figure 5, there is a toggle action of the parts in closed position which locks the gates closed. Adjustment of such toggle action to a desired locking force is effected by longitudinal adjustments 24a' and 24b' in the links 24a and 24b.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a parlor stall of the character described for retaining an animal while it is being milked and including end portions narrower than the normal width of said animal and two side portions, said side and end portions being connected to maintain a relationship providing a retaining enclosure for the animal while it is being milked, said side portions being spaced apart at their centers a distance only slightly greater than said normal width, structure comprising: a gate in one of said side portions hinged near the center of its side portion and having its swinging end portion inwardly curved toward the cooperating end portion of the stall.

2. In a parlor stall of the character described for retaining an animal while it is being milked and including end portions narrower than the normal width of said animal and two side portions, said side and end portions being connected to maintain a relationship providing a retaining enclosure for the animal while it is being milked, said side portions being spaced apart at their centers a distance only slightly greater than said normal width, structure comprising: a pair of gates in one of said side portions each hinged near the center of its side portion and having its swinging end portion inwardly curved toward the cooperating end portion of the stall, with each of said gates being located adjacent one of said end portions of the stall when said gates are closed.

CHESTER A. THOMAS.

REFERENCES CITED

The following references are of record in the file of this patent:

UNITED STATES PATENTS

| Number | Name | Date |
|---|---|---|
| D. 90,482 | Ferris | Aug. 15, 1933 |
| 190,345 | Mann | May 1, 1877 |
| 502,829 | Phillips | Aug. 8, 1893 |
| 1,142,246 | Gagan | June 8, 1915 |
| 1,754,752 | Grim | Apr. 15, 1930 |
| 1,805,405 | Kuhns | May 12, 1931 |
| 1,863,603 | Marshall | June 21, 1932 |
| 1,934,177 | Ferris | Nov. 7, 1933 |
| 2,198,048 | Babson et al. | Apr. 23, 1940 |
| 2,269,012 | De Carli | Jan. 6, 1942 |

FOREIGN PATENTS

| Number | Country | Date |
|---|---|---|
| 438,432 | Great Britain | Nov. 18, 1935 |